United States Patent [19]
Lohr

[11] 3,952,397
[45] Apr. 27, 1976

[54] METHOD FOR FORMING A PRINT WHEEL WITH METAL RIM

[75] Inventor: Joseph B. Lohr, Wayne, N.J.

[73] Assignee: Litton Business Systems, Inc., Pinebrook, N.J.

[22] Filed: June 17, 1974

[21] Appl. No.: 479,852

[52] U.S. Cl. .............................. 29/421 R; 101/375; 264/328
[51] Int. Cl.² .......................................... B23P 17/00
[58] Field of Search ....... 101/375; 29/421, 148.4 D, 29/159.2; 72/61, 62; 264/318, 328

[56] References Cited
UNITED STATES PATENTS

| | | |
|---|---|---|
| 2,158,044 | 5/1939 | Haller .................................. 29/421 |
| 2,673,373 | 3/1954 | Heuer .................................. 29/421 |
| 2,770,874 | 11/1956 | Lindow ................................. 29/421 |
| 2,978,751 | 4/1961 | Bright ................................. 101/375 |
| 3,166,831 | 1/1965 | Keith .................................. 29/421 |
| 3,446,107 | 5/1969 | Moyer ................................... 72/62 |
| 3,553,809 | 1/1971 | Yamada et al. ..................... 29/159.2 |
| 3,693,544 | 9/1972 | Trzyna ............................... 101/375 |

*Primary Examiner*—Lowell A. Larson
*Attorney, Agent, or Firm*—Robert F. Rotella; Norman Friedman; Stephen A. Roen

[57] ABSTRACT

A print wheel of the type employed in business machines is formed by positioning a ring-shaped metal blank in a die and forcing fluid plastic under pressure against the ring thereby causing the metal to flow into the characters provided in the die and to assume their shape.

6 Claims, 4 Drawing Figures

U.S. Patent    April 27, 1976    3,952,397
FIG. 1
FIG. 3
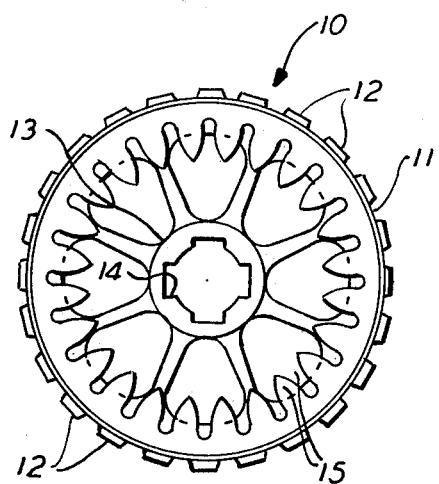
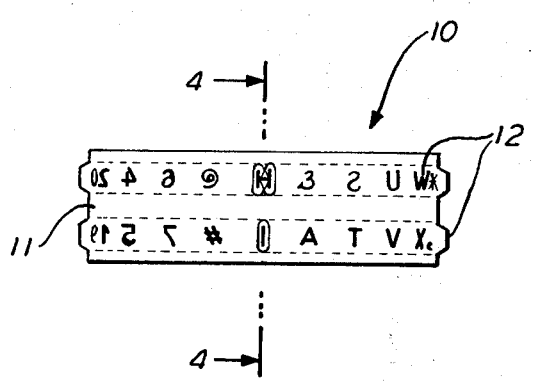
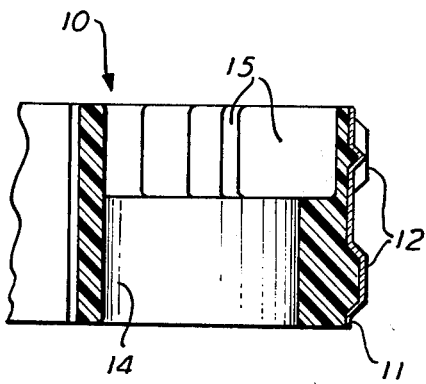
FIG. 4
FIG. 2
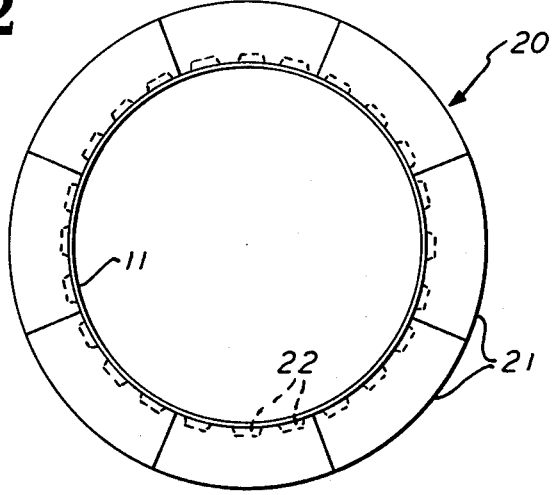

METHOD FOR FORMING A PRINT WHEEL WITH METAL RIM

BACKGROUND OF THE INVENTION

The present invention relates to a method of producing a print or character wheel such as the type commonly utilized in business machines for printing in conjunction with a ribbon. For many applications, print wheels formed of thermoplastic or thermosetting plastic material are preferred because of their relatively low cost and ease of molding. However, it has been found necessary to provide such wheels with a metal coating on the characters which would otherwise be quickly eroded by the high printing pressure encountered in machines of that type.

Such metal-coated plastic print wheels are generally formed by electroplating the plastic core in accordance with techniques adapted from those well-known, particularly in the decorative arts. Known techniques for metal plating of plastics have a number of deficiencies, however. Aside from the high cost and difficulty of controlling the degree and uniformity of the metal layer plated, there is a tendency for the metal to crack and peel thereby reducing the useful life of such parts.

SUMMARY OF THE INVENTION

In accordance with the present invention, the above disadvantages are overcome by providing a print wheel having a plastic core with a metal rim which bears the printing characters in relief. The print wheel is formed by positioning a metal ring-shaped blank in a die and forcing molten plastic under pressure against the blank. The die is provided with intaglio characters and the force applied to the plastic causes the metal to flow into the individual character molds and assume their shape.

Accordingly, an object of this invention is to provide a novel method for forming a print wheel with a metal rim or edge.

Another object of this invention is to provide a plastic wheel with an integral metal rim on which the various characters are formed.

DESCRIPTION OF THE DRAWINGS

FIG. 1 is a plan view of the print wheel provided with a metal rim according to the invention;

FIG. 2 is a plan view of the die employed for manufacturing the print wheel shown in FIG. 1;

FIG. 3 is a side view of the print wheel shown in FIG. 1; and

FIG. 4 is a sectional view taken along line 4—4 of FIG. 3 and in the indicated direction.

DETAILED DESCRIPTION

FIG. 1 shows a print wheel 10 of the type commonly employed in business machines for printing on paper or cards by impact in conjunction with a ribbon. As best seen in FIG. 3, the peripheral edge or rim 11 of wheel 10 is provided with a dual row of type characters 12 which are selectively rotated into position for subsequent printing. Although two rows of type are shown, it is to be understood that a single row or any desired number of rows may be formed depending on the variety of characters required.

Print wheel 10 includes a core member 13 formed by molding a thermosplastic or thermosetting plastic material. The core 13 is comprised of a hub 14 for mounting on a shaft. Wheel 10 may be rotated to bring the appropriate character into printing position by means of a stepping motor (not shown) driving the shaft which engages hub 14. The series of gear teeth 15 disposed around the circumference of wheel 10 is provided for indexing the wheel to insure that the proper character is aligned for subsequent printing.

Referring now to FIG. 2, a suitable die assembly 20 for forming wheel 10 includes a series of hardened tool steel sections 21 which fit together to form a toroid. The inner circumference of each of the die sections 21 contains in intaglio the individual type characters 22 which are to be correspondingly formed on wheel 10. It is to be recognized that only as much of the die assembly 20 as is necessary to understand the principle of the invention is shown herein. Obviously die 20 will have suitable provisions for injecting and containing the fluid plastic under pressure.

Wheel 10 is formed by positioning the ring-shaped metal blank 11 within die 20. The blank 11 is preferably made of soft, deformable metal such as aluminum, copper, brass, or thin soft steel. Once ring 11 is positioned and secured against movement, fluid plastic under sufficient pressure which may be on the order of several thousand pounds per square inch is injected into the mold. The force of the fluid plastic under pressure causes the metal blank 11 to expand radially and deform, thereby flowing into the characters 22 molded in the die sections 21.

The injection molding step is followed by a period during which the fluid plastic is permitted to solidify, either by cooling off, if the plastic was originally heated to a molten state before injection or by setting by chemical action, if the plastic is of the epoxy-type or similar types which are in the fluid state when mixed but harden with time, with or without the application of heat, while still in the die assembly 20.

Once the plastic has sufficiently hardened, the die assembly 20 may be readily removed by causing the sections 21 to move outwardly in a radial direction thereby freeing the finished print wheel 10.

As seen in FIG. 4, both the plastic portion 13 and metal rim 11 of print wheel 10 are contoured according to the shape of the characters formed. Thus, the horizontal portion of the "H" will be seen to have a triangular cross-section and the vertical "I" has a trapezoidal cross-section.

It will be further noted that the plastic portion 13 and rim 11 are essentially closely interfaced and consequently the rim is thus prevented from slipping about the plastic core during use.

It is to be recognized that various modifications are possible without departing from the scope of the invention.

For instance, the die may have the characters formed in relief thereby creating intaglio characters on the print wheel, if desired. In addition, the core and rim are not limited to being plastic and metal, respectively, by may have a metal core with plastic rim or be formed entirely of plastic or metal or any other suitable combination of materials.

Accordingly, the present invention is to be measured solely by the following claims.

What is claimed is:

1. A method of forming a print wheel having a rim bearing characters comprising the steps of:

positioning a blank member in a die assembly containing the characters to be formed on the print wheel;

forcing fluid material against said blank member to urge said member against the characters in said assembly to thereby deform said member to assume the configuration of said characters;

allowing said fluid material to harden;

and removing the finished print wheel from said die assembly.

2. A method of forming a print wheel as set forth in claim 1, wherein:

said blank member is a ring adapted to be positioned against a correspondingly shaped surface of said die assembly.

3. A method of forming a print wheel as set forth in claim 2, wherein:

said ring is made of deformable metal.

4. A method of forming a print wheel as set forth in claim 3, wherein:

said fluid material is molten plastic.

5. A method of forming a print wheel as set forth in claim 4, wherein:

said molten plastic is injection-molded in said die assembly.

6. A method of forming a print wheel as set forth in claim 3, wherein:

said blank member is forced against the characters in said die assembly and is deformed, thereby assuming the configuration of said characters.

* * * * *